(12) United States Patent
Chiproot

(10) Patent No.: US 9,249,908 B2
(45) Date of Patent: Feb. 2, 2016

(54) CLAMP ASSEMBLY WITH RESILIENT BAND HAVING NOTCHES

(75) Inventor: Avi Chiproot, Kfar-Saba (IL)

(73) Assignee: Krausz Industries Development Ltd., Tel Aviv (IL)

( * ) Notice: Subject to any disclaimer, the term of this patent is extended or adjusted under 35 U.S.C. 154(b) by 870 days.

(21) Appl. No.: 13/116,187

(22) Filed: May 26, 2011

(65) Prior Publication Data

US 2012/0299295 A1   Nov. 29, 2012

(51) Int. Cl.
    F16L 21/02   (2006.01)
    F16L 21/00   (2006.01)
    F16L 21/06   (2006.01)

(52) U.S. Cl.
    CPC ............... *F16L 21/005* (2013.01); *F16L 21/06* (2013.01)

(58) Field of Classification Search
    CPC ................................ F16L 21/005; F16L 21/06
    USPC ............ 24/279, 20 LS, 20 TT, 22; 292/256.6, 292/256.65, 256.67; 285/365, 367, 373, 285/420, 421
    See application file for complete search history.

(56) References Cited

U.S. PATENT DOCUMENTS

| | | | | |
|---|---|---|---|---|
| 1,830,782 A * | 11/1931 | Burnish et al. | ................. | 285/341 |
| 2,403,449 A * | 7/1946 | Meyer et al. | ..................... | 24/279 |
| 2,773,710 A * | 12/1956 | Smith | ........................... | 285/187 |
| 2,893,097 A * | 7/1959 | Hill et al. | ........................ | 24/279 |
| 3,235,293 A * | 2/1966 | Condon | ........................ | 285/233 |
| 3,861,723 A * | 1/1975 | Kunz et al. | ..................... | 285/410 |
| 4,128,921 A * | 12/1978 | Heinze et al. | .................... | 24/279 |
| 4,468,842 A * | 9/1984 | Perry et al. | ........................ | 24/279 |
| 4,715,626 A * | 12/1987 | Gehring et al. | ................ | 285/230 |
| 5,280,970 A * | 1/1994 | Straub | ............................ | 285/112 |
| 5,700,043 A * | 12/1997 | Rohard et al. | .............. | 292/256.6 |
| 5,851,038 A * | 12/1998 | Robinson et al. | ......... | 292/256.67 |
| 6,293,556 B1 | 9/2001 | Krausz | | |
| 7,055,223 B2 * | 6/2006 | Cassel et al. | ................... | 24/20 R |
| 7,320,485 B2 * | 1/2008 | Amendolea et al. | ........... | 285/407 |
| 7,341,287 B2 * | 3/2008 | Gibb et al. | ...................... | 285/367 |
| 7,425,023 B2 * | 9/2008 | Hartig et al. | ................... | 285/367 |
| 7,533,910 B2 * | 5/2009 | Ma et al. | ........................ | 285/420 |
| 7,571,940 B2 | 8/2009 | Krausz | | |
| 2004/0104576 A1* | 6/2004 | Krausz et al. | .................. | 285/373 |
| 2004/0108713 A1* | 6/2004 | Krausz et al. | .................... | 285/53 |

(Continued)

FOREIGN PATENT DOCUMENTS

DE   8804348    10/1988
DE   19514940   10/1996

(Continued)

OTHER PUBLICATIONS

PCT Search Report PCT/US2015/039261, Sep. 24, 2012.

*Primary Examiner* — Robert J Sandy
*Assistant Examiner* — David Upchurch
(74) *Attorney, Agent, or Firm* — Dekel Patent Ltd.; David Klein

(57) ABSTRACT

A clamp assembly including a curved resilient band terminating in a radial direction in two clamp members and in an axial direction in two end faces that are bent radially inwards, the resilient band being adapted to receive therein an elastomeric seal that contacts an outer contour of a pipe, wherein the end faces are formed with a plurality of notches, each of the notches having an open end facing radially inwards and a closed end opposite to the open end, the closed end being wider than the open end.

8 Claims, 1 Drawing Sheet

(56) References Cited

U.S. PATENT DOCUMENTS

2007/0273151 A1* 11/2007 Krausz et al. ................ 285/406
2011/0095520 A1    4/2011 Krausz

FOREIGN PATENT DOCUMENTS

| EP | 0286561 | 10/1988 |
| EP | 0550813 | 7/1993 |

* cited by examiner

U.S. Patent      Feb. 2, 2016      US 9,249,908 B2
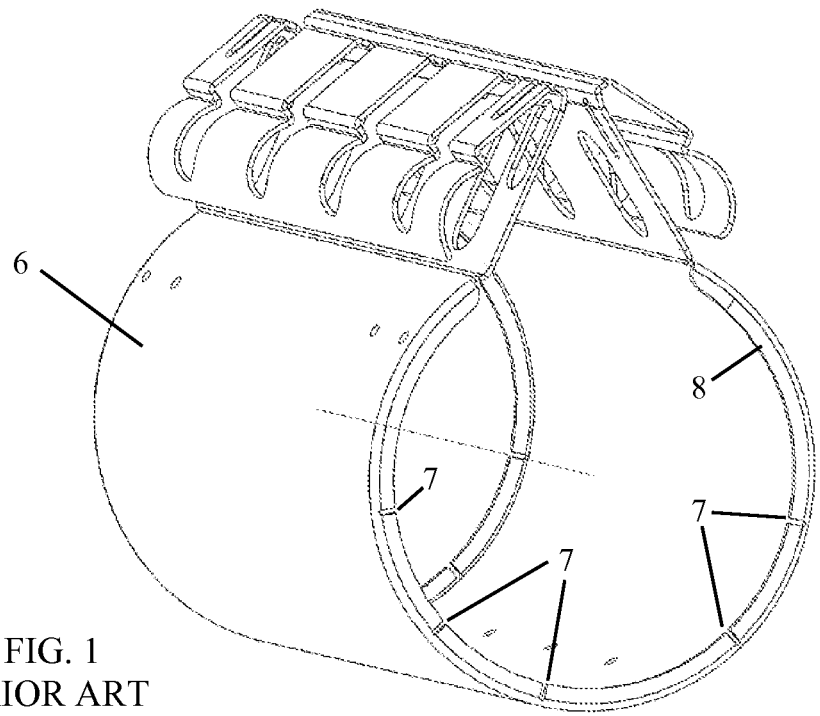
FIG. 1
PRIOR ART
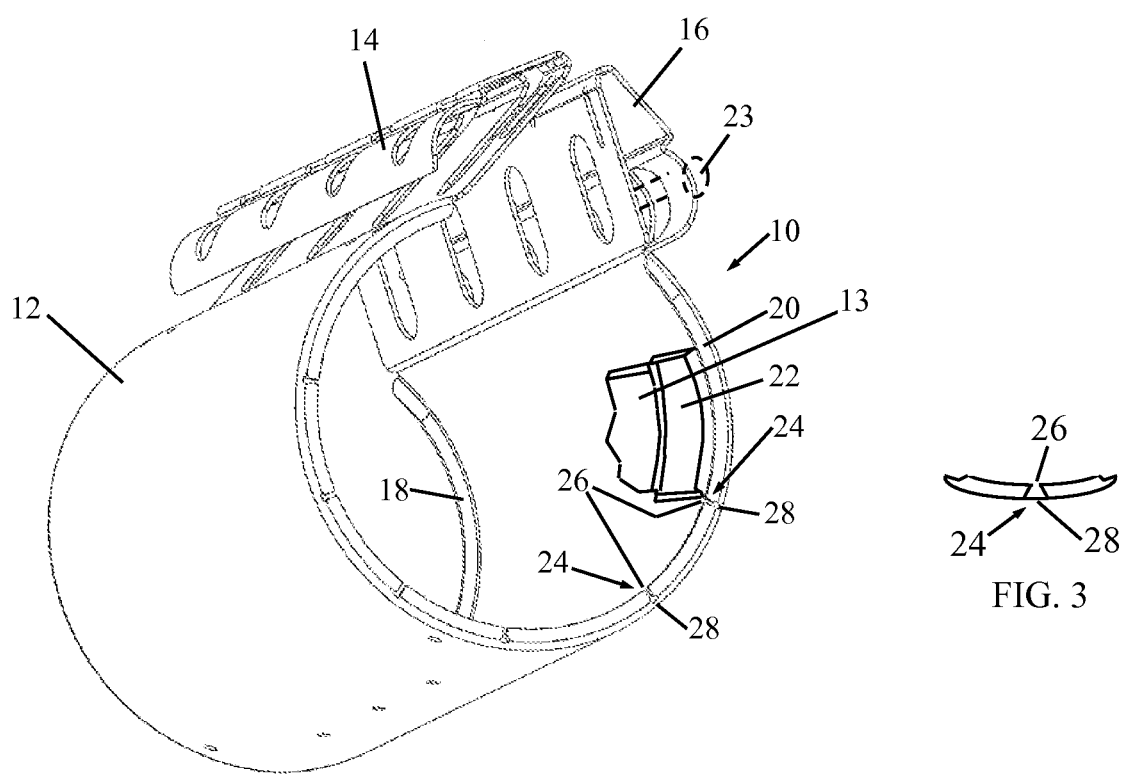
FIG. 2
FIG. 3

CLAMP ASSEMBLY WITH RESILIENT BAND HAVING NOTCHES

FIELD OF THE INVENTION

The present invention relates generally to clamps and grip rings for pipes, and particularly to a clamp assembly with a resilient band formed with notches.

BACKGROUND OF THE INVENTION

Many kinds of removable band-type couplings or clamps for pipes exist in the art. It is noted that throughout the specification and claims, the term "pipe" encompasses any kind of generally cylindrical object.

One kind of clamp has a resilient band that wraps around the pipe and is sealingly tightened on the pipe with bolts or screws. The resilient band is typically made of sheet metal.

An example of such a prior art resilient band 6 is shown in FIG. 1. It is known in the prior art to form notches 7 on end faces 8 of the band 6. The purpose of the notches 7 is to improve the ability of the band 6 to bend when being wrapped and tightened about a pipe (not shown). However, sometimes stresses are formed near the notches 7, which may lead to cracking of the band material near the notches 7.

SUMMARY OF THE INVENTION

The present invention seeks to provide an improved clamp assembly that solves the problem of the prior art, as is described more in detail hereinbelow.

There is thus provided in accordance with an embodiment of the present invention a clamp assembly including a curved resilient band terminating in a radial direction in two clamp members and in an axial direction in two end faces that are bent radially inwards, the resilient band being adapted to receive therein an elastomeric seal that contacts an outer contour of a pipe, wherein the end faces are formed with a plurality of notches, each of the notches having an open end facing radially inwards and a closed end opposite to the open end, the closed end being wider than the open end.

In accordance with an embodiment of the present invention the notch has a stepped increase in width at the closed end.

In accordance with another embodiment of the present invention the notch gradually increases in width from the open end to the closed end.

In accordance with an embodiment of the present invention the closed end includes a circular terminus extending from and wider than the rest of the notch.

In accordance with an embodiment of the present invention the notches are radially equally spaced from one another.

In accordance with another embodiment of the present invention the notches are radially unequally spaced from one another.

In accordance with an embodiment of the present invention an elastomeric seal is disposed in the resilient band.

In accordance with an embodiment of the present invention a fastener, including a shank, operative to fasten the clamp members towards each other in a direction along the shank so as to apply a radially-inward clamping force on the elastomeric seal that contacts the pipe so that the clamp assembly clamps the pipe.

BRIEF DESCRIPTION OF THE DRAWINGS

The present invention will be understood and appreciated more fully from the following detailed description, taken in conjunction with the drawing in which:

FIG. 1 is a simplified pictorial illustration of a prior art clamp assembly;

FIG. 2 is a simplified pictorial illustration of a clamp assembly, constructed and operative in accordance with an embodiment of the present invention; and FIG. 3 is a simplified pictorial illustration of a portion of a clamp assembly, having notches constructed and operative in accordance with another embodiment of the present invention.

DETAILED DESCRIPTION OF EMBODIMENTS

Reference is now made to FIG. 2, which illustrates a clamp assembly 10, constructed and operative in accordance with a non-limiting embodiment of the present invention.

Clamp assembly 10 includes a curved resilient band 12 terminating in a radial direction in two clamp members 14 and 16, and in an axial direction in two end faces 18 and 20 that are bent radially inwards. Resilient band 12 is adapted to receive therein an elastomeric seal 22 (shown partially in broken lines) that contacts an outer contour of a pipe 13. A fastener 23, such as a bolt or screw that has a shank, fastens the clamp members 14 and 16 towards each other in a direction along the shank so as to apply a radially-inward clamping force on the elastomeric seal 22 that contacts the pipe so that the clamp assembly clamps the pipe.

The end faces 18 and 20 are formed with a plurality of notches 24. Each notch 24 has an open end 26 facing radially inwards and a closed end 28 opposite to the open end 26. The closed end 28 is wider than the open end 26, and this structure has been found to reduce and even eliminate stresses in the vicinity of the notches 24 to solve the problem of the prior art.

In the illustrated embodiment of FIG. 2, closed end 28 is a circular terminus extending from and wider than the rest of the notch 24; thus, notch 24 has a stepped increase in width at the closed end 28. Notches 24 are radially equally spaced from one another.

Alternatively, as shown in FIG. 3, notch 24 can gradually increase in width from the open end 26 to the closed end 28. Also, alternatively, there can be an unequal spacing between the notches 24.

The scope of the present invention includes both combinations and subcombinations of the features described hereinabove as well as modifications and variations thereof which would occur to a person of skill in the art upon reading the foregoing description and which are not in the prior art.

What is claimed is:

1. A clamp assembly comprising:
    a curved resilient band terminating in a radial direction in two clamp members and in an axial direction in two end faces that are bent radially inwards, said resilient band being adapted to receive therein an elastomeric seal that contacts an outer contour of a pipe;
    wherein said end faces are formed with a plurality of notches, each of said notches having an open end facing radially inwards and a closed end opposite to said open end, said closed end being wider than said open end.

2. The clamp assembly according to claim 1, wherein said notch has a stepped increase in width at said closed end.

3. The clamp assembly according to claim 1, wherein said notch gradually increases in width from said open end to said closed end.

4. The clamp assembly according to claim 1, wherein said closed end comprises a circular terminus extending from and wider than the rest of the notch.

5. The clamp assembly according to claim 1, wherein said notches are radially equally spaced from one another.

6. The clamp assembly according to claim 1, wherein said notches are radially unequally spaced from one another.

7. The clamp assembly according to claim 1, further comprising an elastomeric seal disposed in said resilient band.

8. The clamp assembly according to claim 1, further comprising a fastener, comprising a shank, operative to fasten said clamp members towards each other in a direction along said shank so as to apply a radially-inward clamping force on the elastomeric seal that contacts the pipe so that said clamp assembly clamps the pipe.

* * * * *